United States Patent
Stewart

(10) Patent No.: US 7,874,209 B2
(45) Date of Patent: *Jan. 25, 2011

(54) CAPACITIVE BULK ACOUSTIC WAVE DISK GYROSCOPES WITH SELF-CALIBRATION

(75) Inventor: Robert E. Stewart, Woodland Hills, CA (US)

(73) Assignee: Northrop Grumman Guidance and Electronics Company, Inc., Woodland Hills, CA (US)

(*) Notice: Subject to any disclaimer, the term of this patent is extended or adjusted under 35 U.S.C. 154(b) by 382 days.

This patent is subject to a terminal disclaimer.

(21) Appl. No.: 12/006,982

(22) Filed: Jan. 8, 2008

(65) Prior Publication Data

US 2009/0173157 A1  Jul. 9, 2009

(51) Int. Cl.
  G01P 9/00 (2006.01)
  G01P 21/00 (2006.01)
(52) U.S. Cl. .................. 73/504.01; 73/504.12; 73/1.37
(58) Field of Classification Search .................. 73/1.37, 73/1.38, 504.02, 504.04, 504.12, 504.13, 73/504.14, 504.15, 504.01
See application file for complete search history.

(56) References Cited

U.S. PATENT DOCUMENTS

| 5,471,875 | A  | * | 12/1995 | Sato et al. | 73/504.13 |
| 7,565,839 | B2 | * | 7/2009  | Stewart et al. | 73/504.12 |
| 2007/0089510 | A1 | * | 4/2007 | Wyse et al. | 73/504.12 |
| 2007/0119258 | A1 | * | 5/2007 | Yee | 73/649 |
| 2008/0223107 | A1 | * | 9/2008 | Stewart | 73/1.38 |
| 2010/0024560 | A1 | * | 2/2010 | Shcheglov | 73/649 |
| 2010/0063763 | A1 | * | 3/2010 | Rozelle | 702/92 |
| 2010/0071465 | A1 | * | 3/2010 | Stewart | 73/504.02 |

* cited by examiner

Primary Examiner—Helen C. Kwok
(74) Attorney, Agent, or Firm—Carmen Patti Law Group, LLC

(57) ABSTRACT

The apparatus in one embodiment may have capacitive bulk acoustic wave disk gyro operated in a closed loop mode. A self-calibration system may be operatively coupled to the capacitive bulk acoustic wave disk gyroscope. Self-calibration of gyro bias of the gyro may be implemented by interchanging an anti-nodal axis with a nodal axis of the gyro.

20 Claims, 5 Drawing Sheets

---

OPERATING A CAPACITIVE BULK ACOUSTIC WAVE DISK GYRO IN A CLOSED LOOP MODE AND IN AN OPEN LOOP MODE
601

INTERCHANGING AN ANTI-NODAL AXIS WITH A NODAL AXIS OF THE GYRO TO EFFECT SELF-CALIBRATION OF GYRO BIAS OF THE GYRO
602

CAPACITIVE BULK ACOUSTIC WAVE DISK GYROSCOPES WITH SELF-CALIBRATION

CROSS-REFERENCE TO RELATED APPLICATIONS

This application contains subject matter that is related to the subject matter of the following applications, which is assigned to the same assignee as this application.

"BIAS AND QUADRATURE REDUCTION IN CLASS II CORIOLIS VIBRATORY GYROS", Ser. No. 11/499,957, filed Aug. 7, 2006.

"SELF-CALIBRATION FOR AN INERTIAL INSTRUMENT BASED ON REAL TIME BIAS ESTIMATOR", Ser. No. 11/364,316, filed Feb. 28, 2006.

"SELF-CALIBRATING ACCELEROMETER", Ser. No. 11/729,007, filed Mar. 28, 2007.

"SELF-CALIBRATION OF SCALE FACTOR FOR DUAL RESONATOR CLASS II CORIOLIS VIRATORY GYROS", Ser. No. 11/724,378 filed Mar. 15, 2007.

"SELF-CALIBRATING NUCLEAR MAGNETIC RESONANCE GYRO", Ser. No. 11/888,280 filed Jul. 31, 2007.

TECHNICAL FIELD

The invention relates generally to capacitive bulk acoustic wave disk gyros and more particularly to self-calibrating capacitive bulk acoustic wave disk gyros.

BACKGROUND

A specific class of gyro may be identified in which polarity of the gyro bias is reversed when the drive and sense axes are interchanged. This particular class of gyro may be identified as Class II Coriolis Vibratory Gyro (CVG) and may be characterized by being inherently counterbalanced, symmetrical about the input axis and having orthogonal degenerate vibration modes. Self-calibration of the gyro bias with varying angular rate input may be achieved by employing two gyros to measure the angular rate and sequentially reversing the gyro bias. Self-calibration of gyro bias with constant angular rate input may be achieved with a single gyro in applications such as gyrocompassing for North finding. The sequence of data from the gyros may be processed in an algorithm to solve for the gyro biases and subtract them from the measured rate. The two self-calibrated gyro angular rate measurements are averaged to reduce the angle random walk.

Proof-of-concept testing of the Hemispheric Resonator Gyro (HRG) has demonstrated that, in the case of Class II Coriolis Vibratory Gyros (CVG), interchanging the drive and sense modes reverse the polarity of the gyro while keeping the gyro bias unchanged. This ability to electrically reverse the polarity of the gyro enables the direct observation of the gyro bias and allows the bias to be removed as an error source. In a static angular rate environment, such as gyro compassing in pointing applications, a single gyro may be used to determine orientation with respect to true north without the need to mechanically reverse the gyros sensing axis. In dynamic angular rate environments, such as a moving vehicle or aircraft, two gyros per axis with alternating polarities may be used to continuously derive the bias of each gyro and remove gyro bias as an error source in an inertial system's determination of position, velocity and orientation of the vehicle or aircraft. A similar approach has been proposed for the determination of accelerometer bias by alternating the position of the center of gravity of a proofmass to either side of a centerline of a suspension to reverse the polarity of the accelerometer.

Today, state-of-the-art micromachined vibrating gyroscopes operate at low frequencies (for example, 3-30 kHz) and rely on increase in mass and excitation amplitude to reduce noise floor and improve bias stability. It is desirable to reduce the flicker noise floor, or bias uncertainty of vibrating gyros without having to increase the mass and drive amplitude, which is difficult to achieve in low power and small size.

SUMMARY

One embodiment of the present method and apparatus encompasses an apparatus. The apparatus may have capacitive bulk acoustic wave disk gyro operated in a closed loop mode. An example of a capacitive bulk acoustic wave gyro is described in the paper titled "High-Frequency Capacitive Disk Gyroscopes in (100) and (111) Silicon" by Houri Johari and Farrokh Ayazi presented at the MEMS 2007 conference in Kobe, Japan. A self-calibration system may be operatively coupled to the capacitive bulk acoustic wave disk gyroscope. Self-calibration of gyro bias of the gyro may be implemented by interchanging an anti-nodal or driven axis with a nodal or sensing axis of the gyro.

Another embodiment of the present method and apparatus encompasses a method. The method may comprise operating a capacitive bulk acoustic wave disk gyro in a closed loop mode and interchanging an anti-nodal or driven axis with a nodal or sensing axis of the gyro to effect self-calibration of gyro bias of the gyro.

DESCRIPTION OF THE DRAWINGS

The features of the embodiments of the present method and apparatus are set forth with particularity in the appended claims. These embodiments may best be understood by reference to the following description taken in conjunction with the accompanying drawings, in the several figures of which like reference numerals identify like elements, and in which:

DETAILED DESCRIPTION

Embodiments of the present method and apparatus are directed to operating capacitive bulk acoustic wave (BAW) disk gyroscopes in a closed loop mode and employing self-calibration technology to improve performance and increase applications. Capacitive bulk acoustic wave z-axis gyroscopes have been designed and implemented on both (100) and (111) silicon substrates. The capacitive BAW disk gyros are stationary devices operating in their degenerative bulk acoustic modes with very small vibration amplitudes (<20 nm). The advantages of high frequency BAW gyros are: reduced size; higher Q, which improves noise and bias stability; larger bandwidth, and improved shock resistance. In addition, the high Q is maintained in air, which reduces, the cost and complexity of the wafer-scale packaging of the gyroscope.

In one embodiment of the present method and apparatus the resonator of the gyro may be driven in an n=3 mode to match the mechanical symmetry of the (100) single crystal silicon. Three electrodes are required for pickoff and three for forcing for both the drive and sense axes for a total of twelve electrodes. Self-Calibration of gyro bias is implemented in this gyro by interchanging the anti-nodal axis with the nodal axis. In order to avoid errors due to misalignment of the electrodes it is required that the anti-nodal drive electrodes are interchanged with the nodal pickoff electrodes and the anti-nodal pickoff electrodes are interchanged with the nodal drive electrodes. In an inertial system under dynamic operating conditions two gyros with alternating polarities or a single gyro with two resonators with alternating polarities are required per axis.

The application of self-calibration technology to capacitive bulk acoustic wave (BAW) gyroscopes has the potential to improve performance by more than an order of magnitude and increase the number of applications. Besides the open-loop operation of the capacitive bulk acoustic wave (BAW) gyroscope, the gyroscope may be configured to operate in a closed-loop or force to rebalance mode.

Figure 1:
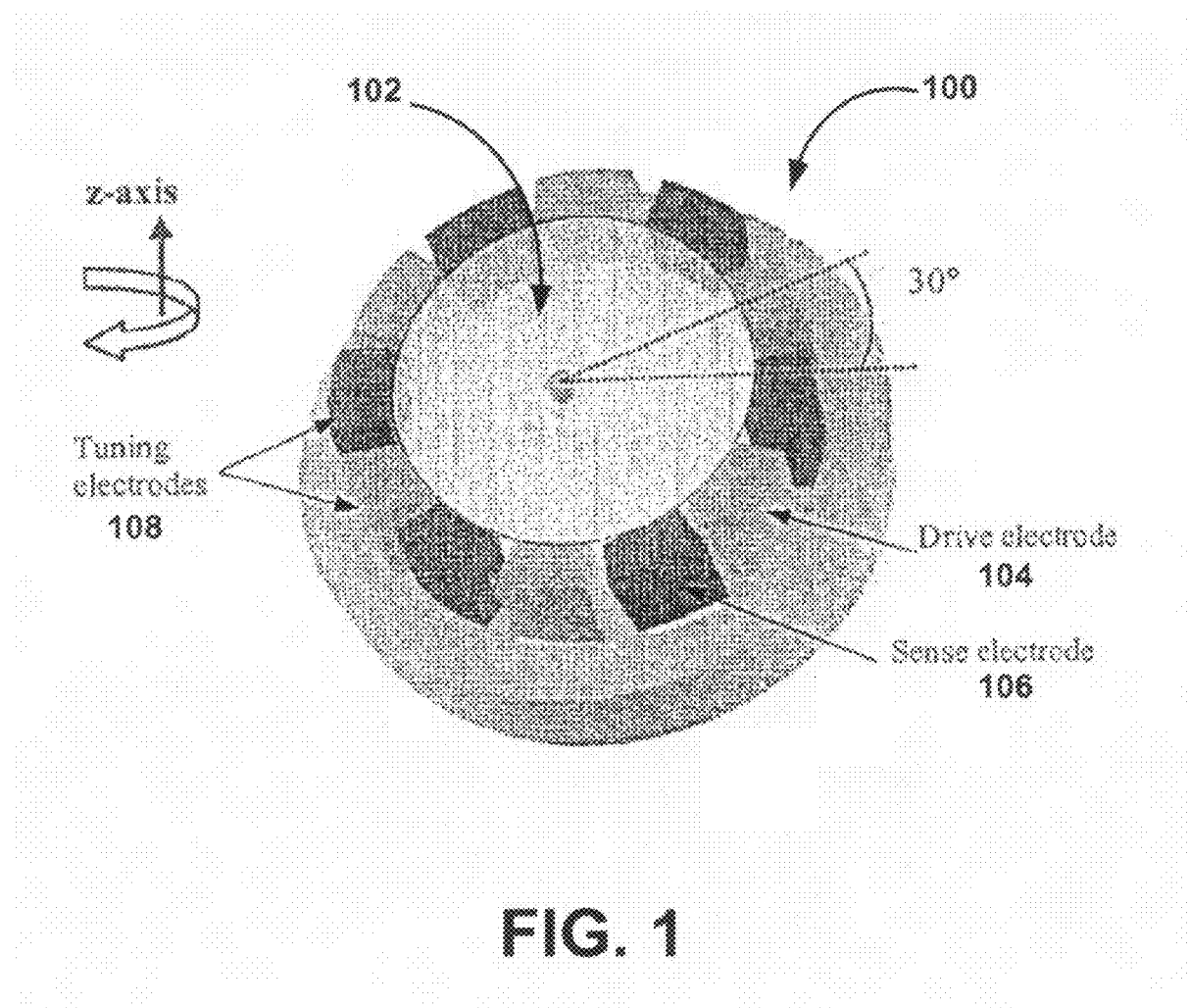
FIG. 1 depicts a coriolis-based BAW gyroscope for use with the present method and apparatus.

As schematically shown in FIG. 1, the coriolis-based BAW gyroscope 100 consists of a center-supported disk structure 102 with capacitively-coupled drive or forcer electrodes 104, sense or pickoff electrodes 106 and control or tuning electrodes 108. The capacitive BAW disk gyros are implemented in single crystal silicon (SCS) and designed to operate in either the primary or secondary degenerative elliptic bulk acoustic modes.

Due to the anisotropic nature of (100) SCS, only the secondary elliptical modes of (100) SCS disk that are spatially 30 degrees apart have identical frequencies (FIG. 2a). In (111) SCS disk gyros, the primary elliptical modes of disk (which are offset by 45 degrees instead of 30 degrees) have identical frequencies. As a result electrodes should be placed at every 30 degrees for (100) SCS or 45 degrees for (111) SCS circumferentially around the disk to maximize the sense and drive transduction.

One of the critical parameters in designing a Coriolis gyroscope is the angular gain. The angular gain is defined as the ratio of the change in the vibration pattern angle to the applied angle of rotation. The angular gain depends on the sensor structure as well as the type of resonant modes in operation. The angular gain of a solid disk structure is derived to be 1.8× larger for primary elliptic modes than for the secondary elliptic modes. Since the sensitivity is linearly proportional to the angular gain, BAW disk gyros in (111) Si have higher sensitivity compared to the identical devices in (100) Si. Nevertheless, (100) silicon substrates have advantages in terms of CMOS compatibility and supply availability compared to (111) silicon substrates.

Figure 2:
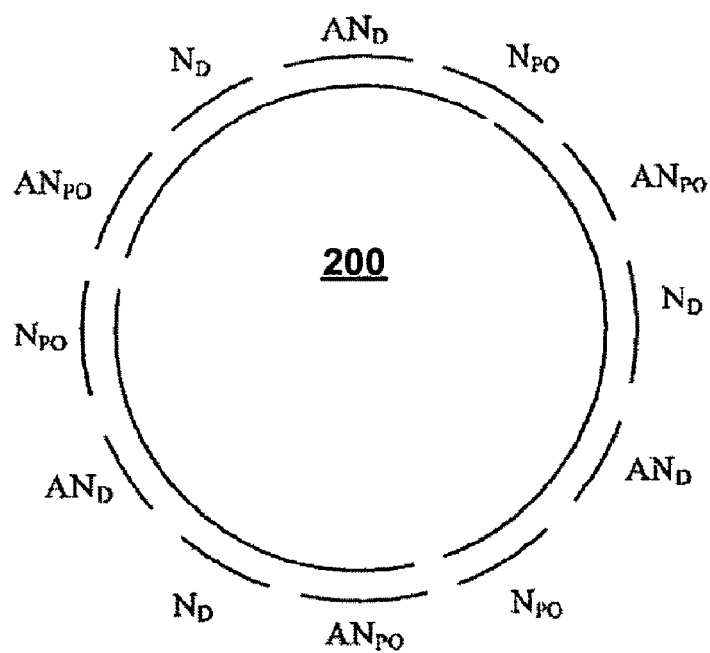
FIG. 2 illustrates the pickoff and forcer electrode configuration for the (100) silicon version in the normal mode according to the present method and apparatus.

FIG. 2 illustrates the pickoff and forcer electrode configuration for the (100) silicon version in the normal mode. The resonator 200 is driven in the n=3 mode to match the mechanical symmetry of the (100) single crystal silicon. Three electrodes may be provided for pickoff and three for forcing for both the drive and sense axes for a total of twelve electrodes. The following nomenclature is used to identify the electrode functions:

AND Anti-nodal drive—forcer for driving resonator to desired amplitude;
AN-PO Anti-nodal pickoff—pickoff for sensing drive amplitude;
ND Nodal drive—forcer for rebalancing Coriolis force in sense axis due to angular rotation; and
NPO Nodal pickoff—pickoff for sensing Coriolis induced displacement.

Figure 3:
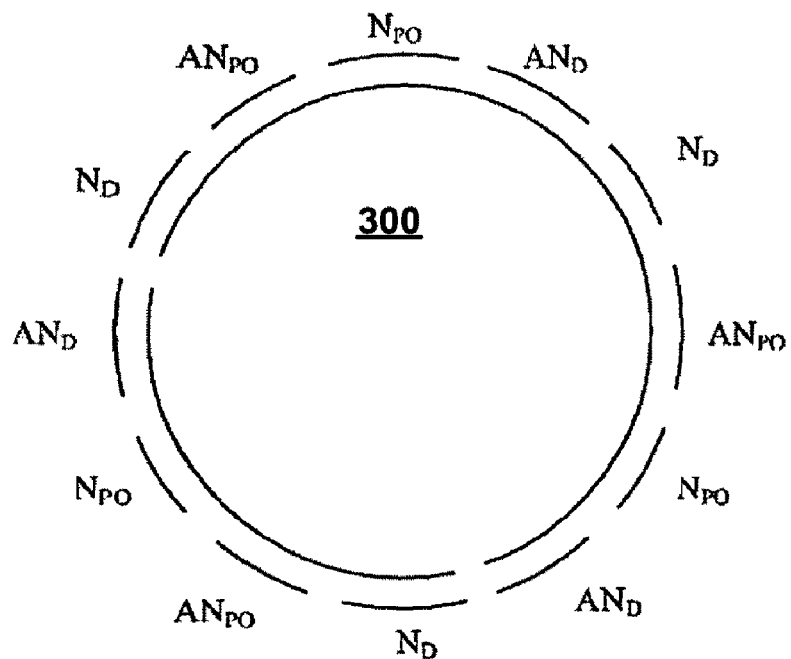
FIG. 3 illustrates the pickoff and forcer electrode configuration for the (100) silicon version in the reverse mode.

FIG. 3 illustrates the pickoff and forcer electrode configuration for the (100) silicon version in the reverse mode for the resonator 300. The anti-nodal drive has been interchanged with the nodal pickoff and the anti-nodal pickoff interchanged with the nodal drive. Interchanging the drive and sense axis in Class II Coriolis Vibratory Gyros causes the gyro scale factor to reverse polarity while the gyro bias polarity remains unchanged. This effect allows gyro bias to be observed in real time and removed as an error source as described in patent applications "Bias And Quadrature Reduction In Class II Coriolis Vibratory", Ser. No. 10/452,686, filed Jun. 2, 2003, and "Self-Calibration For An Inertial Instrument Based On Real Time Bias Estimator", Ser. No. 11/364,316, filed Feb. 28, 2006, which is hereby incorporated by reference.

Figure 4:
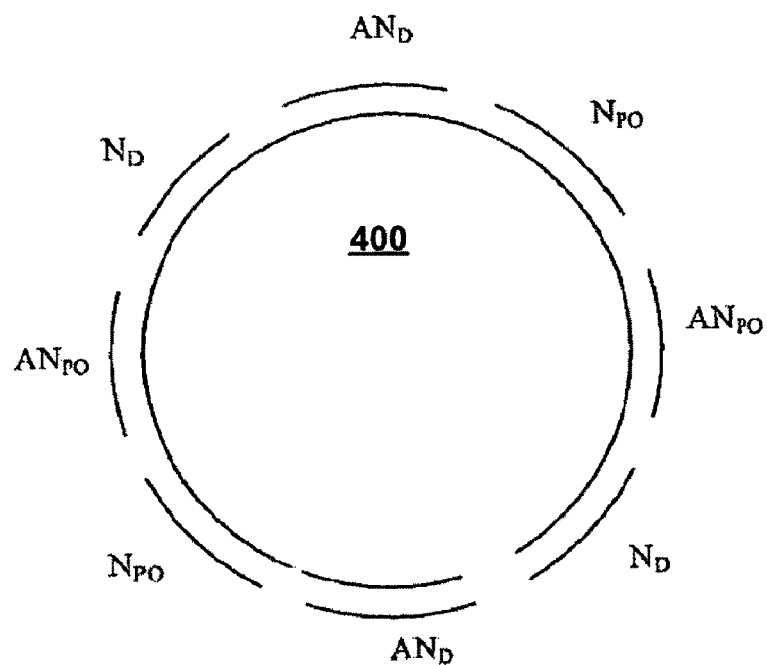
FIG. 4 illustrates the pickoff and forcer electrode configuration for the (111) silicon version in the normal mode according to the present method and apparatus.

FIG. 4 illustrates the pickoff and forcer electrode configuration for the (111) silicon version in the normal mode for the resonator 400. The resonator 400 is driven in the n=2 mode to match the mechanical symmetry of the (111) single crystal silicon. Two electrodes are required for pickoff and two for forcing for both the drive and sense axes for a total of eight electrodes.

Figure 5:
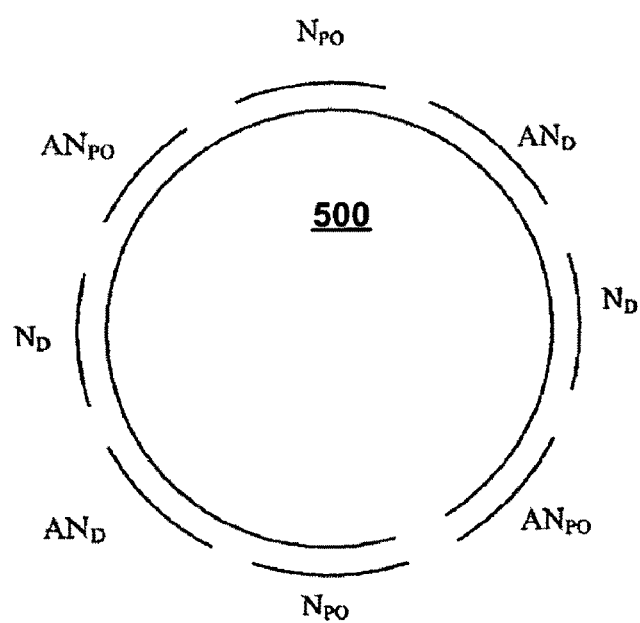
FIG. 5 illustrates the pickoff and forcer electrode configuration for the (111) silicon version in the reverse mode.

FIG. 5 illustrates the pickoff and forcer electrode configuration for the (111) silicon version in the reverse mode for the resonator 500. The anti-nodal drive has been interchanged with the nodal pickoff and the anti-nodal pickoff interchanged with the nodal drive.

In embodiments of the present method and apparatus self-calibration of gyro bias is implemented in this gyro by interchanging the anti-nodal axis with the nodal axis. In order to avoid errors due to misalignment of the electrodes it is required that the anti-nodal drive electrodes are interchanged with the nodal pickoff electrodes and the anti-nodal pickoff electrodes are interchanged with the nodal drive electrodes. In embodiments of the present method and apparatus in an inertial system under dynamic operating conditions two gyros with alternating polarities or a single gyro with two resonators with alternating polarities are required per axis. The two gyro output signals may be processed in the inertial system using a Kalman filter.

Figure 6:
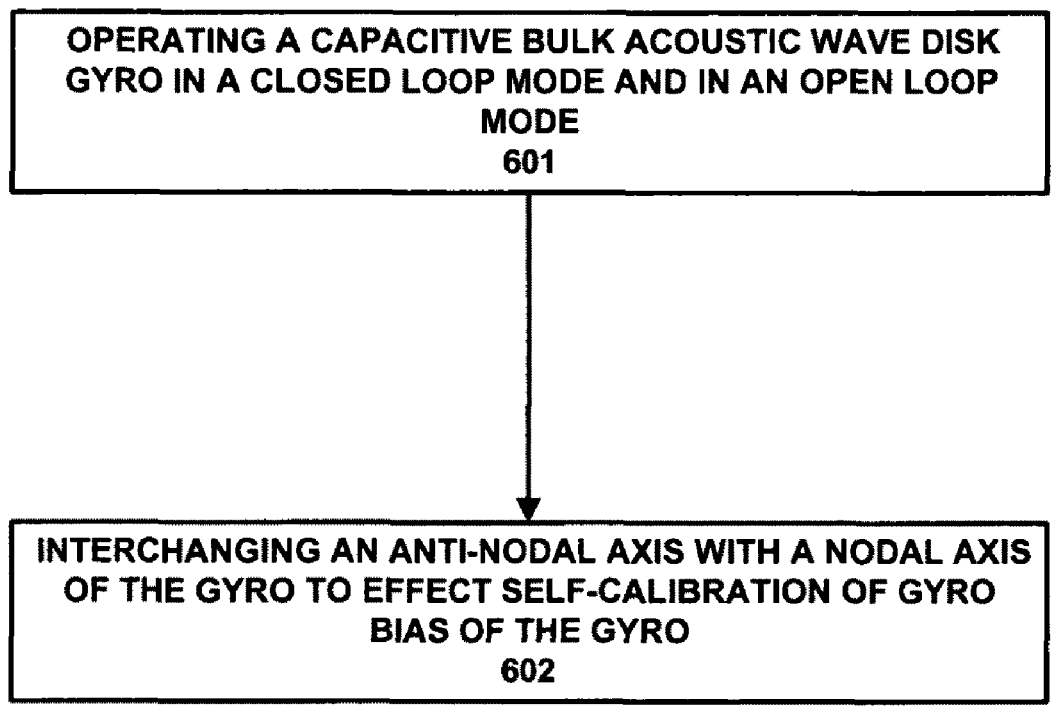
FIG. 6 depicts in a flow diagram one embodiment according to the present method.
Figure 7:
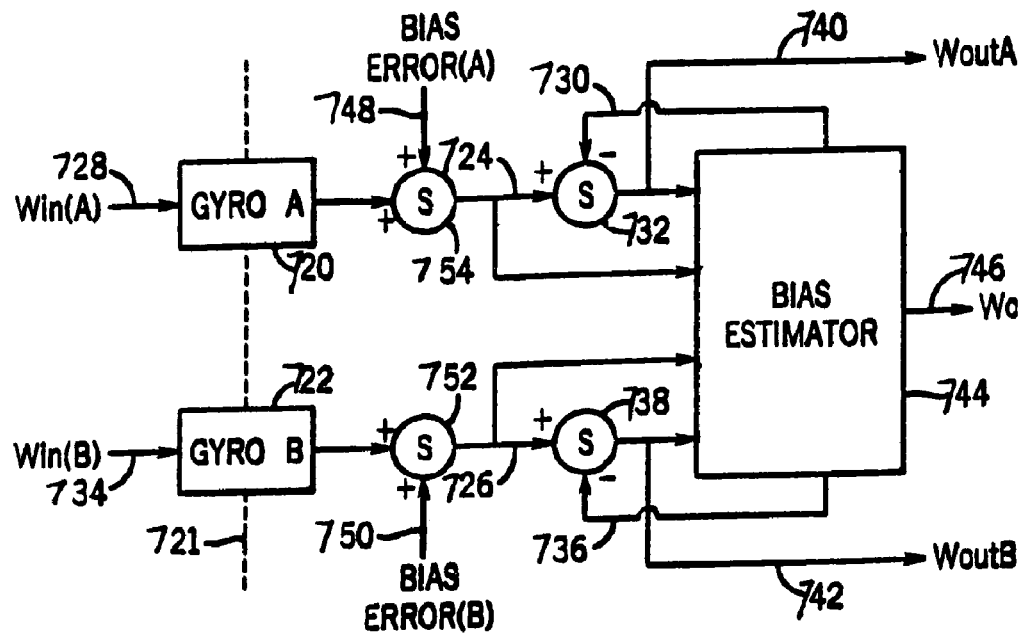
FIGS. 7 and 8 are representative diagrams of exemplary embodiments of the present invention.
Figure 8:
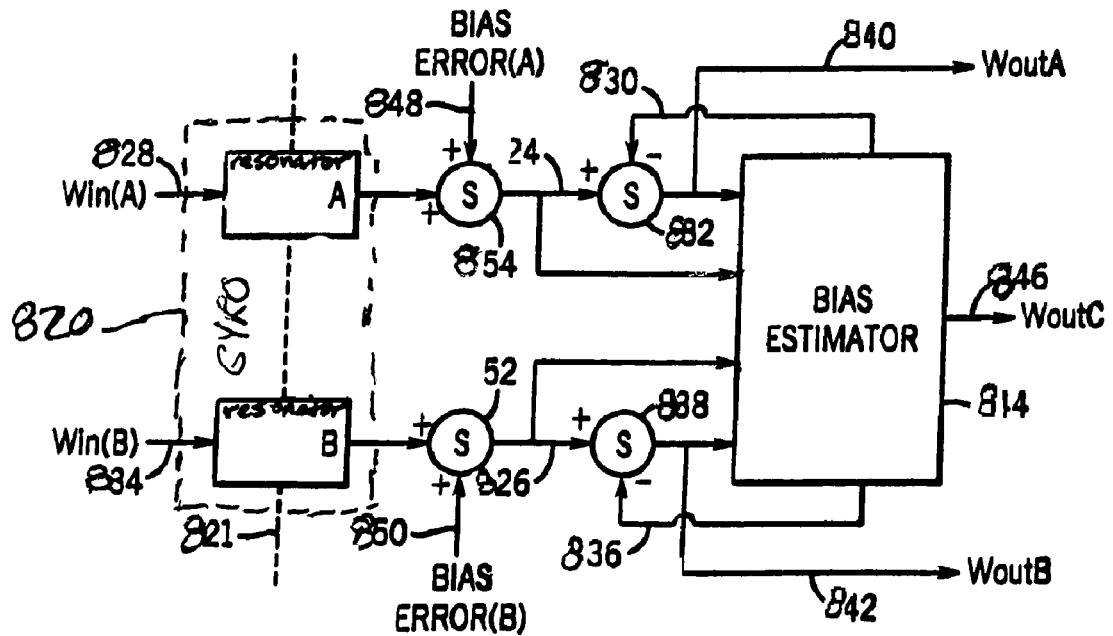

FIG. 6 depicts in a flow diagram one embodiment according to the present method. The method may comprise, in a first step 601, operating a capacitive bulk acoustic wave disk gyro in a closed loop mode and, in a second step 602, interchanging an anti-nodal axis with a nodal axis of the gyro to effect self-calibration of gyro bias of the gyro. FIG. 7 is an exemplary block diagram of an illustrative embodiment of a self-calibrating inertial instrument in accordance with the present invention. As used herein, the same reference numeral may be utilized to refer to an input line as well as the input signal carried by the line; the appropriate meaning will be clear from the context. Inertial instruments 720 and 722 receive respective input signals 728 and 734 representing the attribute to be measured. In this example, the attribute being measured by the gyroscopes is angular position such as measured in degrees. It will be understood that this diagram is provided to assist in explanation of the operation of an embodiment of the present invention and does not identically correspond to physical structure. For example, inputs 724 and 726 will normally be generated by devices within the inertial instruments 720 and 722, and the summation nodes may also be internal to the inertial instruments. The inertial instruments 720 and 722 are oriented relative to each other to share a common axis or plane 721 relative to the attribute being measured. Thus, if the inertial instruments 720 and 722 were perfect, each would produce an identical output value since each senses the same attribute having the same orientation relative to the attribute being sensed. For example, if the inertial instruments were gyroscopes, each gyroscope (assuming each was a perfect gyroscope) would produce an output with the same value in degrees. The input 724 is a combination of a sensed input signal 728 combined with a bias signal 748 (BiasA) by summation node 754. Similarly, input 726 is a combination of a sensed input signal 734 combined with a bias signal 750 (BiasB) by summation node 752. The bias signals 730 and 736 are utilized to provide error correction resulting in more accurate outputs 740 and 742 by inertial instruments 720 and 722, respectively. A bias estimator 744 receives the inputs 724 (MeasA) and 726 (MeasB) as well as the outputs 740 and 742. The bias generator generates the error correction bias signals 730 and 736. It also generates a computed output value 746 that may comprise output 740, output 742, or combination of outputs 740 and 742 as will be explained below. The elements shown in FIG. 7 do not have to be implemented as discrete components, as shown, for example, at 820 of FIG. 8. For example, two separate inertial instruments could each contain all of the necessary components with the required information being shared between respective bias estimators contained in each inertial instrument. Alternatively, all of the required functions could be contained in a single integrated device which would contain functionality for two inertial instruments and the bias estimator.

The present apparatus in one example may comprise a plurality of components such as one or more of electronic components, hardware components, and computer software components. A number of such components may be combined or divided in the apparatus.

The present method and apparatus are not limited to the particular details of the depicted embodiments and other modifications and applications are contemplated. Certain other changes may be made in the above-described embodiments without departing from the true spirit and scope of the present method and apparatus herein involved. It is intended, therefore, that the subject matter in the above depiction shall be interpreted as illustrative and not in a limiting sense.

I claim:

1. An apparatus comprising:
a capacitive bulk acoustic wave disk gyro operated in a closed loop mode; and
a self-calibration system operatively coupled to the capacitive bulk acoustic wave disk gyroscope;
wherein self-calibration of gyro bias of the gyro is implemented by interchanging an anti-nodal axis with a nodal axis of the gyro.

2. The apparatus according to claim 1, wherein the gyro has a plurality of electrodes having nodal pickoff electrodes and forcing electrodes, and wherein anti-nodal forcer electrodes are interchanged with the nodal pickoff electrodes and anti-nodal pickoff electrodes are interchanged with nodal forcer electrodes to effect the interchanging of the anti-nodal axis with the nodal axis of the gyro.

3. An apparatus comprising: a capacitive bulk acoustic wave disk gyro having a resonator having a mechanical symmetry of (100) single crystal silicon; a drive system that drives the resonator in an n=3 mode, the drive system operatively coupled to the resonator; a self-calibration system operatively coupled to the resonator and the drive system; wherein self-calibration of gyro bias of the gyro is implemented by interchanging an anti-nodal axis with a nodal axis of the gyro.

4. The apparatus according to claim 3, wherein the gyro is operated in a degenerative bulk acoustic mode.

5. The apparatus according to claim 3, wherein the gyro has drive and sense axes, wherein the gyro has a plurality of electrodes, and wherein each of the drive and sense axes has respectively, of the plurality of electrodes, three electrodes that are pickoff electrodes and three further electrodes that are forcing electrodes.

6. The apparatus according to claim 3, wherein the gyro has a plurality of electrodes having pickoff electrodes and forcing electrodes, and wherein anti-nodal forcer electrodes are interchanged with nodal pickoff electrodes and anti-nodal pickoff electrodes are interchanged with nodal forcer electrodes to effect the interchanging of the anti-nodal axis with the nodal axis of the gyro.

7. The apparatus according to claim 3, wherein in an inertial system under dynamic operating conditions the apparatus further comprises two gyros with alternating polarities.

8. The apparatus according to claim 3, wherein in an inertial system under dynamic operating conditions the apparatus further comprises a single gyro with two resonators with alternating polarities per axis.

9. The apparatus according to claim 3, wherein interchanging the anti-nodal axis with a nodal axis in the gyro causes a gyro scale factor to reverse polarity while a gyro bias polarity remains unchanged.

10. An apparatus comprising: a capacitive bulk acoustic wave disk gyro having a resonator having a mechanical symmetry of (111) single crystal silicon; a drive system that drives the resonator in an n=2 mode, the drive system operatively coupled to the resonator; a self-calibration system operatively coupled to the resonator and the drive system; wherein self-calibration of gyro bias of the gyro is implemented by interchanging an anti-nodal axis with a nodal axis of the gyro.

11. The apparatus according to claim 10, wherein the gyro is operated in a degenerative bulk acoustic mode.

12. The apparatus according to claim 10, wherein the gyro has drive and sense axes, wherein the gyro has a plurality of electrodes, and wherein each of the drive and sense axes has respectively, of the plurality of electrodes, two electrodes that are pickoff electrodes and two further electrodes that are forcing electrodes.

13. The apparatus according to claim 10, wherein the gyro has a plurality of electrodes having pickoff electrodes and forcing electrodes, and wherein anti-nodal forcer electrodes are interchanged with nodal pickoff electrodes and anti-nodal pickoff electrodes are interchanged with nodal forcer electrodes to effect the interchanging of the anti-nodal axis with the nodal axis of the gyro.

14. The apparatus according to claim 10, wherein in an inertial system under dynamic operating conditions the apparatus further comprises two gyros with alternating polarities.

15. The apparatus according to claim 10, wherein in an inertial system under dynamic operating conditions the apparatus further comprises a single gyro with two resonators with alternating polarities per axis.

16. The apparatus according to claim 10, wherein interchanging the anti-nodal axis with a nodal axis in the gyro causes a gyro scale factor to reverse polarity while a gyro bias polarity remains unchanged.

17. A method comprising: operating a capacitive bulk acoustic wave disk gyro in a closed loop mode; and interchanging an anti-nodal axis with a nodal axis of the gyro to effect self-calibration of gyro bias of the gyro.

18. The method according to claim 17, wherein the gyro has a plurality of electrodes having pickoff electrodes and forcing electrodes, and wherein anti-nodal forcer electrodes are interchanged with nodal pickoff electrodes and anti-nodal pickoff electrodes are interchanged with nodal forcer electrodes to effect the interchanging of the anti-nodal axis with the nodal axis of the gyro.

19. The method according to claim 17, wherein interchanging the anti-nodal axis with a nodal axis in the gyro causes a gyro scale factor to reverse polarity while a gyro bias polarity remains unchanged.

20. The method according to claim 17, wherein the capacitive bulk acoustic wave disk gyro is implemented in single crystal silicon.

* * * * *